United States Patent [19]
Penny

[11] 3,990,525
[45] Nov. 9, 1976

[54] SEALING SYSTEM FOR A ROTARY ROCK BIT

[75] Inventor: Samuel Lee Penny, Lancaster, Tex.

[73] Assignee: Dresser Industries, Inc., Dallas, Tex.

[22] Filed: Dec. 19, 1975

[21] Appl. No.: 642,288

Related U.S. Application Data

[63] Continuation-in-part of Ser. No. 553,762, Feb. 27, 1975, abandoned.

[52] U.S. Cl. .............................. 175/337; 175/339; 175/371; 308/8.2
[51] Int. Cl.² ........................................ E21B 9/08
[58] Field of Search ..................... 175/227–229, 175/371, 372, 339, 340, 337; 308/8.2

[56] References Cited
UNITED STATES PATENTS

| | | | |
|---|---|---|---|
| 2,075,997 | 4/1937 | Reed ................................. | 308/8.2 |
| 2,194,675 | 3/1940 | Sanders et al. .................. | 175/372 X |
| 2,648,526 | 8/1953 | Lanchester ...................... | 175/340 |
| 3,113,630 | 12/1963 | Williams, Jr. .................... | 175/371 X |
| 3,881,560 | 5/1975 | Williams, Jr. .................... | 175/337 |
| 3,964,554 | 6/1976 | Ricks et al. ...................... | 175/371 X |

FOREIGN PATENTS OR APPLICATIONS

| | | | |
|---|---|---|---|
| 1,295,380 | 5/1962 | France .............................. | 175/371 |
| 1,260,080 | 3/1961 | France .............................. | 175/372 |
| 725,381 | 3/1955 | United Kingdom ................ | 175/356 |

*Primary Examiner*—Ernest R. Purser
*Assistant Examiner*—Richard E. Favreau
*Attorney, Agent, or Firm*—Eddie E. Scott

[57] ABSTRACT

A sealing system for a rotary rock bit acts as a barrier to the pulverized cuttings and other materials in the borehole and prevents the materials from entering the bearing area through the cone mouth opening of the cone cutter. The bearing rollers are substantially captured in a groove machined into the cone cutter. This allows a seal unit to be located at a substantial distance from the hostile drilling environment and increases seal life. The shirttail portion of the bit body and the base of the cone cutter cooperate to retard materials in the borehole from contacting the seal unit. The sealing system is provided without reducing the bearing capacity of the bit's bearing system.

4 Claims, 2 Drawing Figures

SEALING SYSTEM FOR A ROTARY ROCK BIT

REFERENCE TO RELATED APPLICATION

This is an continuation-in-part of application Ser. No. 553,762, filed Feb. 27, 1975 now abandoned.

BACKGROUND OF THE INVENTION A cutter

The present invention relates to the art of earth boring and, more particularly, to a rotary rock bit with improved means for sealing the bearings from materials in the borehole. The present invention is especially adapted for use in that type of rotary rock bit popularly known as a three-cone bit; however, its use is not restricted thereto, and the present invention can be used in other types of rotary rock bits.

A three-cone rotary rock bit is adapted to be connected as the lowest member of a rotary drill string. As the drill string is rotated, the bit disintegrates the earth formations to form an earth borehole. The three-cone rotary rock bit includes three individual arms that extend angularly downward from the main body of the bit. The lower end of each arm is shaped to form a spindle or bearing pin. a cone A is mounted upon each bearing pin and adapted to rotate thereon. Individual bearing systems promote rotation of the cone cutters. The bearing systems have traditionally been roller bearings, ball bearings, friction bearings, or a combination of the aforementioned bearings. The cone cutters include cutting structure on their outer surfaces that serve to disintegrate the formations as the bit is rotated. Various forms of seals have been provided between the cone cutter and the arms upon which they are mounted; however, the prior art seals have in many instances proven to be less than satisfactory.

The rotary rock bit must operate under very severe conditions, and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cones. They have provided a longer useful lifetime for the cones. This has resulted in the bearing system of the bit being generally the first to fail during the drilling operation. Consequently, a need exists for improved bearing systems to extend the useful lifetime of the bit. In attempting to improve the bearing system, various seal systems have been provided to maintain the bearing area free of harmful materials. In attempting to provide an improved bearing system incorporating an improved sealing system, great care should be taken that the overall capacity of the bearing system is not reduced.

One problem encountered when trying to develop a satisfactory sealing system for the bit bearings arises due to the nature and extent of cone movement relative to the bearing shaft or pin. Good movement is complex and includes rapid axial and radial as well as wobbling motions. In lubricated sealed bearing bits, such motions generate pressure variations in the lubricant that are sensed by the seal means. Moreover, these sensed pressure variations often result in lubricant loss. Preferably, seal means for lubricated drill bit bearings should have the ability to withstand substantial pressure variations; the ability to seal effectively for long periods of time in the presence of sand or other foreign particles; and the ability to seal protectively in the face of excessive cone movement and wear. In air cooled bits wherein a gaseous fluid is circulated through the bit with some of the circulating fluid directed through the bit bearings for cooling and flushing of the bearing components, conditions often exist where the air pressure and volume is inadequate for optimum flushing of the bearings. Under these conditions, the cuttings generated by the bit action on the bottom cannot be efficiently lifted off the bottom of the borehole and tend to fall back to the bottom until a time when regrinding by the bit reduces the individual particles to a size small enough to be lifted by the low volume of circulating fluid. It can readily be appreciated that a bit working in a deep bed of cuttings with an insufficiency of fluid flushing through the bit bearings will be subjected to said cuttings filtering into the bearings unless a satisfactory sealing system is provided. In the bearings, the cuttings will be caught up between the rotating bearing members creating an abrasive grinding-milling-wearing action, which is extremely detrimental to the entire bearing cluster and can be a major factor in reducing bit bearing life.

The present invention provides a seal means which will act as a barrier to the pulverized cuttings, keeping these cuttings and other materials in the borehole from entering the bearing are through the cone mouth opening, thus providing a clean environment for the metal bearing elements and eliminating abrasive wearing action. This will vastly improve the bearing life by preventing abrasive cuttings from entering the bearings and contributing to wear of the individual bearing components, thereby contributing to the ultimate failure of the full bearing cluster. The shirttail of the bit body and the base of the cone cutter cooperate to retard materials in the borehole from contacting the seal means. Abrasive wear is considered a major factor in limiting bearing life in blast hole drilling bit applications and is especially significant in conditions where the air volume is marginal. This latter condition exists when air compressor equipment has been neglected and does not perform up to its rated capacity, or as is common with the smaller blast hole drills, the air volume rating of the compressor is marginal to start with. In lubricated sealed bearing bits, the improved seal will maintain the lubricant within the bearing area. The improved seal is provided without reducing the bearing capacity of the bit.

DESCRIPTION OF PRIOR ART

In U.S. Pat. No. 3,765,495 to Henry W. Murdock, assigned to G. W. Murphy Industries, Inc., patented Oct. 16, 1973, a drill bit seal is shown. An earth boring drill employing roller cutters is provided with new and improved seals to inhibit ingress of detritus into the cutter bearing area and egress of lubricant therefrom. The parts may be so arranged that, when assembled, the seal is placed in compression. The shape of the seal is such that its cross section is not overly compressed or displaced when in operating condition; this prevents undue compression set, wear and heating of the seal. Also, the seal has a greater radial cross sectional extent than axial extent by ratio of at least 1½:1 to conserve bearing space and to provide the necessary flexibility to accommodate the various movements of the cutter relative to the shaft upon which it is rotatably mounted.

In U.S. Pat. No. 3,746,405 to Russell L. Welton, assigned to Globe Oil Tools Company, a division of the Rucker Company, patented July 17, 1973, a well drilling bit lubrication and seal is shown. A journal bearing lubrication means and seal cooperatively combined therewith to maintain lubrication throughout the useful life of the roller cutter of the well drilling bit, to the exclusion of foreign materials entering therein from the drilling fluid and surrounding earth formations. A journal bearing of right cylinder form is provided, characterized by the formation of a strategically placed recess or recesses therein and all without subtracting from the load carrying capabilities of the bit; the assembly being retained in working condition by a single element contained with the lubrication means and assuring proper axial placement of the roller cutter.

In U.S. Pat. No. 3,534,823 to Charles R. Frederick, assigned to G. W. Murphy Industries, Inc. patented Oct. 20, 1970, a drill bit is shown. The improved drill bit has a gaseous circulation system for the roller cutters to be used in gas drilling so that a portion of the gas which is circulated through the drill is circulated through the roller cutters to cool the cutter bearings.

In U.S. Pat. No. 3,365,247 to Jean Georges Ferrand, assigned to Societe Nationale des Petroles d'Aquitaine, patented Jan. 23, 1968, a roller bit for borehole drilling is shown. A roller bit having a plurality of rollers rotating on thrust bearings and in which circular grooves are formed in each roller near the base thereof and in each adjacent mounting arm to form an annular passage therebetween. A sealing and securing ring gasket allowing rotational but preventing axial movement of each roller is placed in each annular passage and is connected to a lubrication chamber provided for the thrust bearings but preventing leakage of lubrication from the chambers.

In French Pat. No. 1,260,080 granted by Decree of Mar. 27, 1961 a sealing device for a rotary rock bit is shown.

At least one annular recess is arranged between the journal and the inner wall of the corresponding cutting wheel, in a zone situated between the bearings and the space outside of the cutting wheel, and a sealing device is placed into this recess.

SUMMARY OF THE INVENTION

The present invention provides an improved rotary rock bit having a sealing system which will act as a barrier to the pulverized cuttings and other materials in the borehole and prevent the materials from entering the bearing area through the cone mouth opening of the cone cutter. A seal is provided without reducing the bearing capacity of the bit bearings. The improved bit is for forming a borehole wherein materials are encountered in the borehole during the drilling operation. The bit includes a bit body with at least one bearing pin and shirttail extending therefrom. The bearing pin has a longitudinal axis and a cylindrical portion with an exterior surface section generally parallel to the longitudinal axis. A cone cutter is mounted on the bearing pin with the cone base positioned adjacent the shirttail. The cone cutter has a concave cavity projecting from the cone base. The cavity and cone mouth are positioned over the bearing pin. Bearing means are located in the concave cavity supporting the cone cutter for rotation about the bearing pin. The bearing means include a plurality of cylindrical rollers positioned around the bearing pin between the bearing pin and the cone cutter. The support surface on the exterior surface on the bearing pin supports the rollers. A raceway groove in the cone cutter receives the rollers. A flange is provided projecting from said cone cutter into said cone mouth. Seal means are positioned between the end of the flange and the bearing pin for preventing materials in the borehole from entering the cavity. The rollers are substantially captured in the groove. This allows the seal to be located at a greater distance from the hostile drilling environment and the materials in the borehole are retarded from contacting the seal means by the shirttail and cone base. The above and other features and advantages of the present invention will become apparent upon consideration of the following detailed description of the invention when taken in conjunction with the accompanying drawings.

DETAILED DESCRIPTION OF THE INVENTION

The present invention provides a rotary rock bit with an improved sealing system. In attempting to provide an improved sealing system, extreme care must be taken that the bearing capacity is not reduced. The present invention provides an improved sealing system without reducing the overall bearing capacity. This is critically important in a rotary rock bit where the demand for space is extremely important. The present invention provides a unique geometry of the outer roller race, the shirttail and cone base to allow increased seal protection from the hostile drilling environment. By doing this, the reliability and life of the sealing system is improved, thus improving bit life. The seal unit provided has a smaller diameter.

Figure 1:
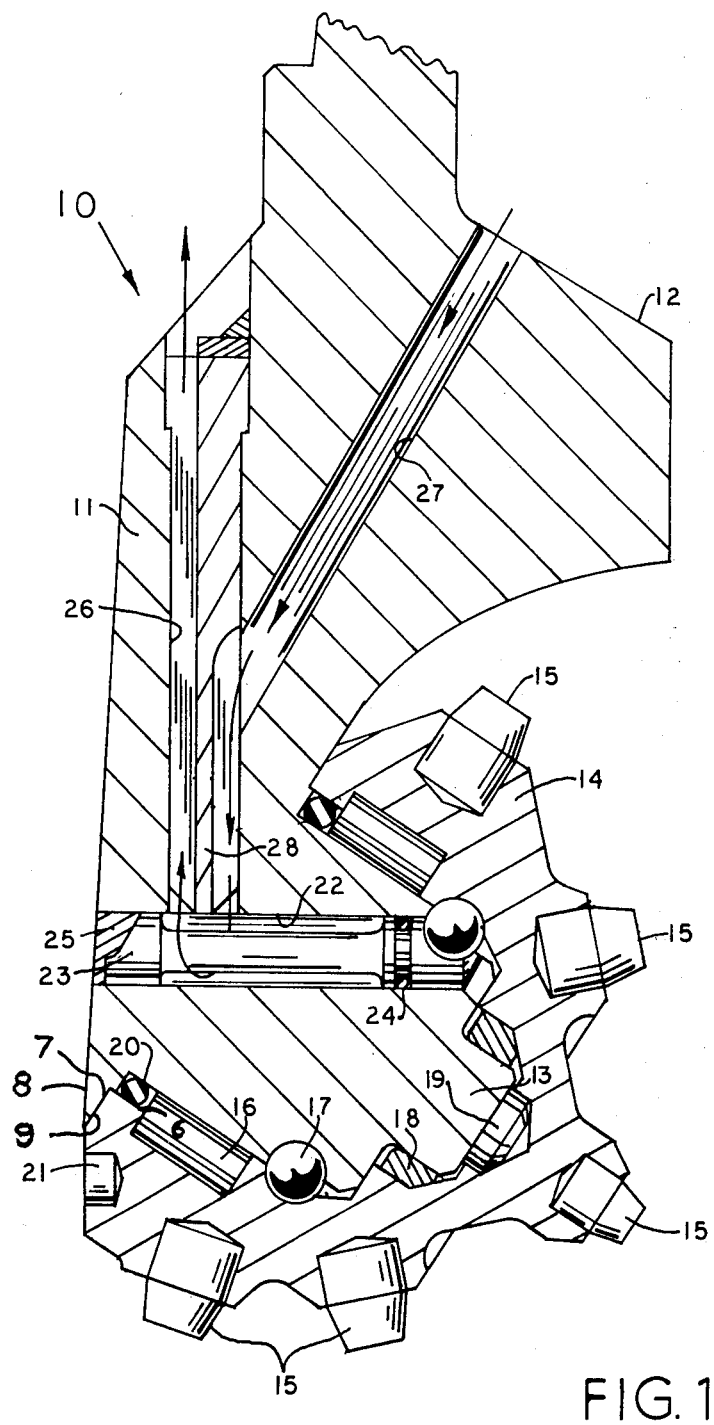
FIG. 1 illustrates a bit constructed in accordance with the present invention wherein circulating air is used to cool the bearings.

Referring now to the drawings and, in particular, to FIG. 1, a rotary rock bit 10 constructed in accordance with the present invention is illustrated. Bit 10 includes a bearing pin 13 extending from the main body of the bit 10. The body of the bit 10 defines an internal chamber 12 which, during drilling, is in communication with the interior drilling fluid passage of a rotary drill string (not shown). A gaseous drilling fluid is circulated through the rotary drill string passing into the internal chamber 12 during the drilling operation. The shirttail 8 projects from the main body of the bit 10 at an angle to the bearing pin 13.

A rotary cone cutter 14 is mounted on the bearing pin 13. The base of the cone cutter is positioned proximate the shirttail 8. The cone cutter 14 includes an internal cavity for receiving the bearing pin 13. The opening of the internal cavity at the base of the cone cutter 14 constitutes a cone mouth. Bearing means are provided within the internal cavity between the cone cutter 14 and the bearing pin 13. The bearing means include a system of roller bearings 16, a system of ball bearings, 17, a friction bearing 18 and a thrust buttom 19. A multiplicity of tungsten carbide inserts 15 are embedded in the outer surface of the cone cutter 14 for disintegrating the formations as the bit is rotated and moved downward. Surf compacts 21 are provided on the heel of the cutter 14.

In order to prolong the life of the bit 10 by cooling the bearings, a gaseous drilling fluid is circulated proximate the internal cavity in the cone cutter 14. The gaseous drilling fluid is forced through the rotary drill string passing into the internal chamber 12. A pair of passages 26 and 27 conduct the drilling fluid from the internal chamber 12 to a ball loading bore 22 extending through the bearing pin 13. A divider 28 separates passage 26 into two sections. Drilling fluid passes into the bore 22 proximate the internal cavity of the cone cutter 14 to cool the bearings. The ball loading bore 22 contains a plug 23 to retain the individual ball bearings in the ball bearing system 16. The plug 23 is welded in position in the bore 22 by weld 25. An "O" ring 24 prevents the gaseous drilling fluid from entering cavity in cone 14. The gaseous drilling fluid exits through the arm 11 of the bit 10 into the borehole and travels upward in the annulus between the wall of the borehole and the rotary drill string. The drilling fluid may also be directed through additional passages (not shown) from the internal chamber 12 directly into the borehole proximate the cutters to remove drill cuttings from the borehole.

Conditions at times exist when the pressure and volume of the circulating drilling fluid is inadequate for optimum flushing of the cuttings from the borehole. Under these conditions, the cuttings generated by the action of the bit on the bottom of the borehole are not efficiently lifted off the bottom and they tend to fall back to the bottom until a time when regrinding by the bit reduces the individual particles to a size small enough to be lifted by the low volume of circulating fluid. It can readily be appreciated that a bit working in a deep bed of cuttings with an insufficiency of fluid flushing through the borehole would be subjected to said cuttings filtering into the bearings if an effective seal were not provided. In the bearings the cuttings would be caught up between the rotating bearing members creating an abrasive grinding-milling-wearing action which would be extremely detrimental to the entire bearing cluster. Abrasive wear is considered a major factor in limiting bearing life in blast hole drilling bit applications and is especially significant in condition where the fluid volume is marginal. This latter condition exists when the air compressor has been neglected and does not perform up to its rated capacity or, as is common with smaller blast hole drills, the fluid volume rating of the compressor is marginal to start with.

With the rollers of the roller bearing system 16 being captured in a groove machined into the cone 14, a flange 6 is provided that projects into the internal cavity of the cone cutter 14. A seal 20 is located between the end of the flange 6 and the bearing pin 13. The seal 20 can be located at a greater distance from the hostile drilling environment and can have a smaller diameter. Materials in the borehole are retarded from contacting the seal 20 by the cooperation of a surface 9 on the shirttail and a surface 7 on the base of the cone cutter 14. The seal is provided with maximum protection. This will increase seal life. The seal 20 is provided in the cone mouth of the cone cutter 14. This cone mouth seal means covers the entire cone mouth area. The improved seal means is provided without reducing bearing capacity.

The structural details of an earth boring bit 10 constructed in accordance with the present invention having been described, the operation of the bit 10 will now be considered with reference to FIG. 1. The present invention provides a cone mouth seal 20 which will act as a barrier to the pulverized cuttings, keeping these cuttings from entering the bearing area through the cone mouth opening, thus providing a clean, dust-free environment for the metal bearing elements and eliminating the abrasive wearing action of cuttings in the bearing area. Screening out of the dust particles will vastly improve the bearing life by preventing abrasive cuttings from entering the bearings and contributing to wear of the individual bearing components and thereby contributing to the ultimate failure of the full bearing cluster.

Bit 10 is connected as the lowest member of a rotary drill string. A gaseous drilling fluid is circulated through the drill string into the internal chamber 12 in the bit 10. The gaseous drilling fluid passes from the internal chamber 12 through passage 27, passage 26 and into bore 22. The gaseous drilling fluid thereby cools the bearings and is exhausted into the borehole through passage 26. The cone mouth seal 20 serves to prevent drill cuttings from entering the bearing area. The surface 9 on the shirttail and surface 7 on the base of the cone cutter 13 cooperate to restrict materials in the borehole from contacting the seal 20 thereby increasing the life of seal 20 and the entire bit 10.

Figure 2:
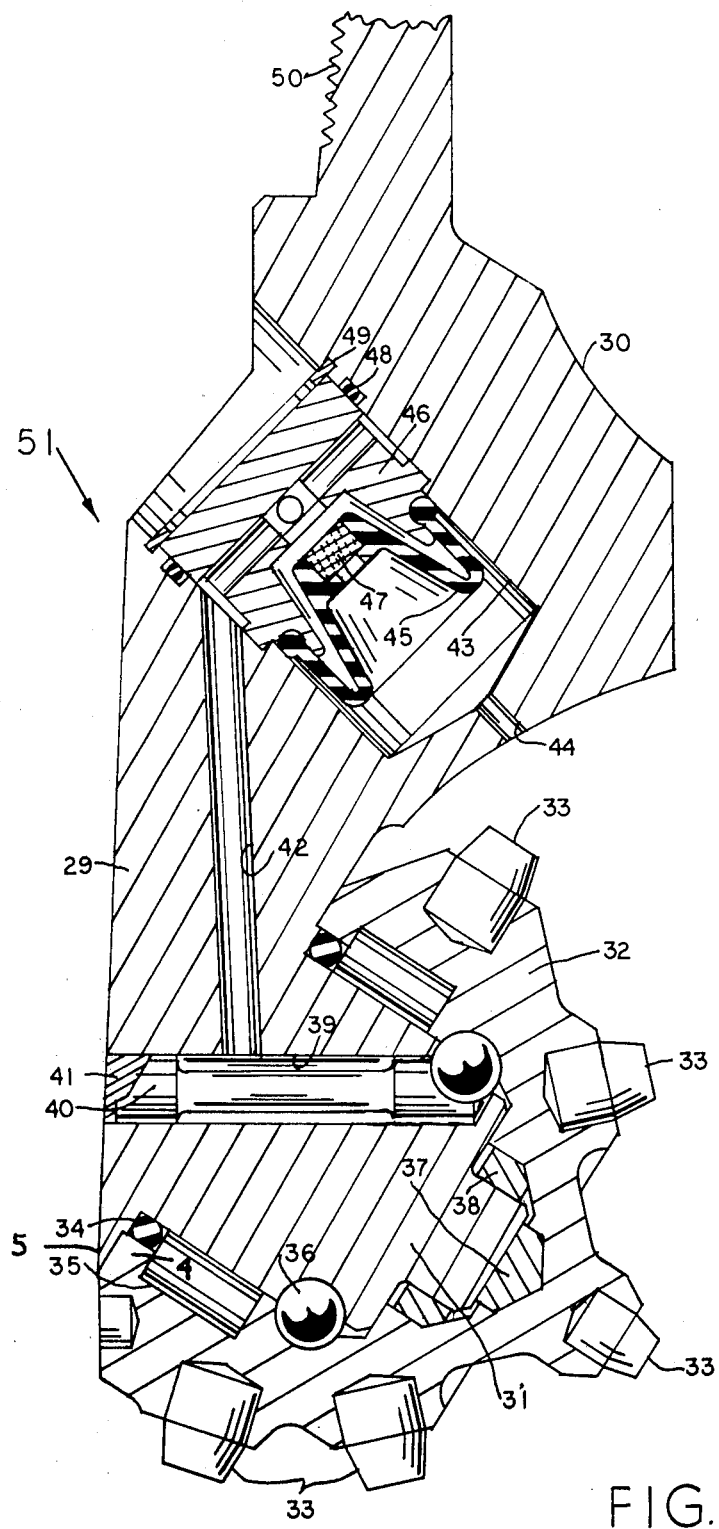
FIG. 2 illustrates another embodiment of a bit constructed in accordance with the present invention.

Referring now to FIG. 2, a sectional view of one arm 29 of a sealed bearing rotary rock bit 51 illustrating another embodiment of the present invention is shown. As illustrated, the arm 29 depends from the upper portion of the bit 51. The bit 51 includes an upper portion 50 that allows the bit to be connected to the lower end of a rotary drill string (not shown). The lower end of arm 29 i provided with an extended journal portion 31. A rotary cone cutter 32 is rotatably positioned upon the extended journal portion of bearing pin 31. The base of cutter 32 is positioned against the shirttail 5 of the bit 51. The cutter 32 includes cutting structure 33 on its outer surface adapted to disintegrate the formations as the bit 51 is rotated and moved downward. The cutting structure 33 is shown in the form of tungsten carbide inserts. However, it is to be understood that other cutting structures such as steel teeth may be used as the cutting structure on the cone cutter 32.

The bit 51 includes a central passageway 30 extending along the central axis of the bit to allow drilling fluid to enter from the upper section of the drill string (now shown) immediately above and pass downward to the bottom of the well bore to flush cuttings and drilling debris from the well bore. A plurality of bearing systems are located in the bearing area between the cutter 32 and the bearing pin 31. The bearing systems in the bearing area includes a series of roller bearings 35, a series of ball bearings 36, a friction bearing 38, and a thrust button 37.

The bit 51 is a lubricated sealed bearing bit. The lubrication system of bit 51 includes a passage 42 that extends through the arm 29 to bearing pin 31 to allow lubricant to be transmitted to the bearings systems. A passage 39 connected to passage 42 allows the make up of the ball bearing system 36 by allowing the balls to be inserted into position after the cone cutter 32 is placed on the bearing pin 31. The series of ball bearings 36 serve to lock the cone cutter 32 on the bearing pin 31. After the balls are in place, a plug 40 is inserted into the bore 39 and welded therein by a weld 41. Plug 40 has a reduced diameter throughout the major portion of its length to allow lubricant to be transmitted to the bearing area. Additional passages may extend from bore 39 to the bearing area to insure a sufficient supply of lubricant to bearings 35, 36, 37 and 38.

A lubricant reservoir is located in the bit 51 to provide a supply of lubricant to the bearings. A flexible diaphragm 45 is positioned in the lubricant reservoir and encloses the reservoir to retain a supply of lubricant. The area within the reservoir chamber 43 but outside of the diaphragm 45 is vented to the dome of the bit 51 by a passageway 44 that connects the lower end of the reservoir chamber 43 with the dome of the bit. The upper end of lubricant reservoir is closed by a cap 46 locked in place by a snap ring 49. An O-ring seal 48 is positioned around the cap 46 to retain lubricant in the lubricant reservoir. A free-breathing porous filter plug 47 extends through the flexible diaphragm 45. The free-bearing porous filter plug 47 provides fluid communication between lubricant in the lubricant area of the reservoir and fluid from the borehole that has entered the pressure equalizing portion of the lubricant chamber 43. The plug 47 is in the form of compressed metal particles positioned within an open metal cylinder.

With the rollers of the roller bearing system 35 being captured in a groove machined into the cone 32, a seal 34 can be located at a greater distance from the hostile drilling environment and can have a smaller diameter. This will increase seal life. The seal 34 is located between the end of flange 4 and the surface of the bearing pin 31 in the cone mouth of the cone cutter 31. This cone mouth seal means covers the entire cone mouth area. The improved seal means is provided without reducing bearing capacity. The seal 34 retains the lubricant within the bit 51 and prevents the ingress of material in the borehole into the bearing area. The shirttail 5 and base of the cutter 32 cooperate to restrict materials in the borehole from contacting the seal 34 thereby increasing the life of seal 34 and bit 51.

The structural details of an earth boring bit 51 constructed in accordance with the present invention having been described, the operation of the bit 51 will now be considered with reference to FIG. 2. The present invention provides a cone mouth seal 34 which will act as a barrier to the pulverized cuttings, keeping these cuttings from entering the bearing area through the cone mouth opening, thus providing an uncontaminated environment for the metal bearing elements and eliminating the abrasive wearing action of foreign materials in the bearing area. The lubricant is retained within the bit 51 to insure a long lifetime for the bearing systems. The shirttail 5 and cone base of cutter 32 cooperate to restrict materials in the borehole from contacting seal 34.

The lubrication system of the bit 51 if filled with a suitable lubricant and the area above the flexible diaphragm 45 is completely filled with lubricant. The flexible diaphragm 45 seals the lower end of the lubricant reservoir and is held in place by the lower portion of the cap 46. The bit 51 will be lowered into a well bore until the cutter 32 contacts the earth formation at the bottom of the borehole. The hydrostatic pressure of fluid in the well bore is substantial and a pressure differential between the pressure of the lubricant inside of the bit 51 and the pressure of fluid in the borehole would ordinarily develop. The lubrication system of bit 51 allows the pressure of fluid in the well bore to be transmitted to the lubricant in the lubricant reservoir and the pressures are equalized as the bit 51 is moved through the borehole. Lubricant from the lubricant reservoir passes through passages 42 and 39 and is transmitted to the bearing systems.

The bit 51 is connected as the lowest element of a rotary drill string by engaging the bit 51 with the drill string by a threaded connection. The bit 51 is rotated and thrust downward, thrusting the cutter 32 against the earth formations. Continued rotation with the weight of the drill string applying a thrust force to the bit 51, causes the cutters to disintegrate the formations and form the desired borehole. The cone mouth seal 34 serves to prevent drill cuttings from entering the bearing area and retains the lubricant inside the bit. The seal is protected by the shirttail 5 and the base of the cone cutter 32.

The embodiments of an invention in which an exclusive property or privilege is claimed are defined as follows:

1. A drill bit, comprising:
   a body;
   a shirttail projecting from said body;
   a bearing shaft extending from said body;
   a roller cone cutter adapted to be rotatably mounted on said bearing shaft, said roller cutter having a cone base and said cone base having a surface with a length;
   said length of surface of said cone base positioned abutting said shirttail;
   bearing means supporting said cutter on said bearing shaft, said bearing means including a multiplicity of rollers;
   a raceway groove in said roller cutter for capturing substantially all of said rollers;
   a flange in said roller cone cutter between said raceway groove and said cone base, said flange having an end facing said bearing shaft; and
   a seal between said bearing shaft and said end of said flange, said seal being protected by said shirttail and said length of surface of said cone base.

2. A rotary rock bit for forming a borehole wherein materials are encountered in the borehole, comprising:
   a head;
   a shirttail projecting from said head;
   a bearing pin depending from said head;
   a cone cutter adapted to be mounted on said bearing pin, said cone cutter having a length of base abutting said shirttail and a concave cavity projecting from a cone mouth, said cavity and cone mouth positioned over said bearing pin;
   bearing means in said cavity between said bearing pin and said cone cutter, said bearing means including a multiplicity of rollers;
   a raceway groove in said cone cutter located within said cavity for capturing substantially all of said rollers;
   a flange in said cone located within said cavity between said raceway groove and said cone cutter base, said flange having an end facing said bearing pin; and
   seal means positioned between the end of said flange and said bearing pin, said seal being located within said cone mouth and protected by the length of cone cutter base abutting said shirttail thereby preventing entry of materials in the borehole into said cavity.

3. A rotary rock bit for forming a borehole wherein materials are encountered in the borehole, comprising:
   a rock bit body;
   at least one bearing pin extending from said rock bit body, said bearing pin having a longitudinal axis;

said rock bit body having a shirttail portion extending away from said bearing pin at an angle to said longitudinal axis;

a cone cutter adapted to be mounted on said bearing pin, said cone cutter having a cone base, a cone mouth in said cone base, and a concave cavity projecting from said cone mouth, said cavity and cone mouth positioned over said bearing pin, said cone base being positioned adjacent said shirttail portion throughout a substantial portion of the length of said cone base;

bearing means located in said cavity supporting said cone cutter for rotation about said bearing pin, said bearing means including a plurality of cylindrical rollers positioned around said bearing pin between said bearing pin and said cone cutter;

a raceway groove in said cone cutter located within said cavity for receiving substantially the entire cylindrical rollers;

said raceway groove providing a flange projecting from said cone cutter into said cone mouth; said flange having an end surface facing said cavity; and seal means positioned within said cone mouth between said cone cutter and said bearing pin for preventing materials in the borehole from entering said cavity, said seal means positioned between said end surface of said flange and said bearing pin whereby said length of cone base and said shirttail portion cooperate to retard materials in the borehole from contacting said seal means.

4. A rotary rock bit suitable for use with a gaseous drilling fluid for forming a borehole wherein materials are encountered in the borehole, comprising:

a head defining an internal chamber;

a shirttail projecting from said head;

a bearing pin depending from said head, said bearing pin having an exterior bearing surface;

a cone cutter adapted to be mounted on said bearing pin, said cone cutter having a length of base abutting said shirttail and a concave cavity projecting from a cone mouth, said cavity and cone mouth positioned over said bearing pin, said length of cone cutter base abutting said shirttail;

bearing means located in said cavity supporting said cone cutter for rotation about said bearing pin, said bearing means including a plurality of cylindrical rollers;

a first passage through said head and said bearing pin extending proximate said bearing means communicating from said internal chamber to a position proximate said bearing means;

a second passage extending through said head communicating from said position proximate said bearing means to the exterior of said bit, whereby a portion of the fluid being circulated through said internal chamber is circulated through said first passage to cool said bearing means and through said second passage to the exterior of said bit;

a raceway groove in said cone cutter located within said cavity for capturing substantially all of said rollers;

said raceway groove providing a flange projecting from said cone cutter into said cavity, said flange having an end surface facing said bearing pin; and seal means positioned between said cone cutter and said bearing pin and located between said bearing pin and said end surface of said flange with said length of base abutting said shirttail for preventing entry of materials in the borehole into contact with said seal means.

* * * * *